US007005812B2

(12) United States Patent
Mitchell

(10) Patent No.: US 7,005,812 B2
(45) Date of Patent: Feb. 28, 2006

(54) COMMUTATION CONVERTER FOR A BRUSHLESS SERVO MOTOR

(76) Inventor: Lawrence Hardy Mitchell, 8481 Rock Riffle Rd., Athens, OH (US) 45701

( * ) Notice: Subject to any disclaimer, the term of this patent is extended or adjusted under 35 U.S.C. 154(b) by 138 days.

(21) Appl. No.: 10/200,531

(22) Filed: Jul. 22, 2002

(65) Prior Publication Data
US 2004/0036427 A1 Feb. 26, 2004

Related U.S. Application Data

(60) Provisional application No. 60/307,256, filed on Jul. 23, 2001.

(51) Int. Cl.
*H02K 23/00* (2006.01)
(52) U.S. Cl. ............... 318/254; 318/439; 318/802; 324/207.2; 324/207.25
(58) Field of Classification Search ......... 318/254, 318/138, 439, 139, 721–724, 799–801, 812; 324/207.11, 207.2, 207.25
See application file for complete search history.

(56) References Cited

U.S. PATENT DOCUMENTS

| 4,030,005 A | | 6/1977 | Doemen | |
|---|---|---|---|---|
| 4,988,905 A | | 1/1991 | Tolmie, Jr. | |
| 5,023,527 A | | 6/1991 | Erdman et al. | |
| 5,079,487 A | * | 1/1992 | Malang | 318/254 |
| 5,200,675 A | * | 4/1993 | Woo | 318/254 |
| 5,210,474 A | * | 5/1993 | Oswald | 318/254 |
| 5,258,696 A | * | 11/1993 | Le | 318/254 |
| 5,563,980 A | * | 10/1996 | Chen et al. | 388/811 |
| 5,739,650 A | * | 4/1998 | Kimura et al. | 318/254 |
| 5,859,510 A | | 1/1999 | Dolan et al. | |
| 5,892,339 A | * | 4/1999 | Park et al. | 318/254 |
| 6,028,406 A | * | 2/2000 | Birk | 318/254 |
| 6,064,175 A | * | 5/2000 | Lee | 318/809 |
| 6,215,261 B1 | * | 4/2001 | Becerra | 318/254 |
| 6,326,778 B1 | * | 12/2001 | Hummel | 324/173 |
| 6,639,370 B1 | * | 10/2003 | Gabrys | 318/161 |
| 6,700,345 B1 | * | 3/2004 | Wilkens | 318/626 |
| 6,703,805 B1 | * | 3/2004 | Griffitts | 318/459 |
| 6,713,979 B1 | * | 3/2004 | Naito et al. | 318/280 |

OTHER PUBLICATIONS

Mitchell, Quotation for Commutation Converter, Jul. 12, 2000.
Mitchell, Invoice for Commutation Converter, Jul. 26, 2000.
Mitchell, Memo regarding interfacing Commutation Converter, Jul. 26, 2000.
Mitchell, Memo regarding connection & verification, Aug. 9, 2000.
Mitchell, Memo regarding interface and PROTO3 software, Aug. 12, 2000.
Mitchell, notes from phone call describing a problem w/ Siemens motor, Aug. 21, 2000.
Mitchell, Memo to Aloisio, Oct. 3, 2000.
Mitchell, Invoice 3028 to York Electric Motors, Nov. 30, 2000.
Mitchell, Invoice 3096 to Industrial Motor Service Corp., Mar. 13, 2001.

* cited by examiner

*Primary Examiner*—David Martin
*Assistant Examiner*—Eduardo Colon Santana
(74) *Attorney, Agent, or Firm*—David G. Herold

(57) ABSTRACT

An apparatus that allows a non-standard brushless motor to be driven with a standard drive amplifier. The motor rotation angle signal from a custom feedback device is converted to a standard format for driving a standard drive amplifier. Operator display and keypad allow interactive format selection and motor parameter display.

7 Claims, 6 Drawing Sheets

| SHAFT ANGLE DEGREES | 120 DEGREE HALL SENSOR OUTPUT STATES | | | RESULTING MOTOR ARMATURE LEAD EXCITATION FROM DRIVE | | |
|---|---|---|---|---|---|---|
| | U | V | W | U | V | W |
| 0 | 1 | 0 | 1 | + | | - |
| 60 | 1 | 0 | 0 | + | - | |
| 120 | 1 | 1 | 0 | | - | + |
| 180 | 0 | 1 | 0 | - | | + |
| 240 | 0 | 1 | 1 | - | + | |
| 300 | 0 | 0 | 1 | | + | - |

FIG. 4

COMMUTATION CONVERTER FOR A BRUSHLESS SERVO MOTOR

CROSS-REFERENCE TO RELATED APPLICATIONS

This application claims the benefit of PPA Ser. No. 60/307,256 filed Jul. 23, 2001 by the present inventor.

BACKGROUND—FIELD OF INVENTION

This invention relates generally to brushless motor drive systems and specifically to driving a non-standard brushless motor with a standard drive amplifier.

BACKGROUND—DESCRIPTION OF PRIOR ART

Brushless servo motors are finding increasing application. From computer disk drives to machine tools, when something has to move, brushless servo motors often do the moving. Brushless motors require commutation in order to operate. Commutation switches electric currents to the drive magnet coils in the motor in a sequence providing desired motor movement. Commutation is performed by an electronic commutator. The commutator is generally housed separately, with power generation electronics, as a motor drive amplifier.

In a typical motor, electric drive magnets are disposed around a rotatably supported permanent magnet rotor. The commutator must switch current to the correct drive magnets in the correct direction at the correct time in order to produce desired rotor movement. The commutator must know the current rotor angle, relative to the stator windings, to provide commutation. A motor mounted feedback device measures rotor angle and produces a signal to the drive amplifier.

For basic commutation to control rotor speed and direction, a low-resolution feedback device is adequate, often provided by a plurality of shaft mounted Hall effect sensors. Increasingly, motors are equipped with high-resolution feedback devices for more accurate motor control. Rather than using separate feedback devices for basic commutation and precision motor control, the high-resolution feedback device is used for both functions. The motor often has a companion drive amplifier that accepts the custom signals produced by the feedback device and controls the motor accordingly. Many different feedback devices are in use, producing a variety of incompatible rotation angle signal formats. Many motors cannot be run without their companion drive amplifier.

In an industrial setting with many different servomotor-driven machines, incompatible equipment creates servicing difficulties. A repair shop receiving a failed servomotor without the companion drive amplifier can repair the motor, but cannot run the motor to determine that it is fully operational. Motors with two problems, one obvious and the other subtle, may be returned to service still broken.

What is needed then is an apparatus that allows a servomotor to be test run with a standard drive amplifier.

OBJECTS AND ADVANTAGES

It is therefore an object of the present invention to convert the signals from a servo motor mounted feedback device to a standard format for exciting a standard servomotor drive amplifier.

It is a further object of the present invention to provide the operator with a common operating interface to avoid relearning the operation of seldom-used driver amplifiers.

SUMMARY

The present invention accepts various servomotor commutation feedback signal including Hall effect sensor, resolver, incremental encoder and serial encoder formats compatible with a variety of motor manufacturers and outputs a standard commutation signal compatible with many common servomotor drive amplifiers.

BRIEF DESCRIPTION OF THE DRAWINGS

FIG. 4 shows the 120-degree Hall signals and the corresponding commutation pattern

DESCRIPTION

Figure 1:
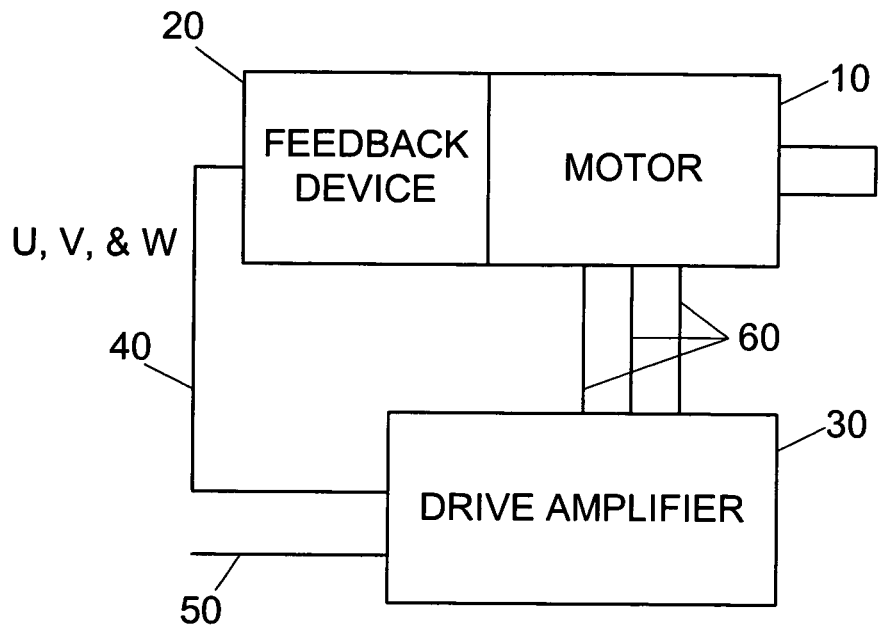
FIG. 1 is a schematic diagram of a standard brushless servo motor configuration

FIG. 1 shows a standard brushless servomotor configuration. Brushless servo motor 10 is a typical three phase two-pole AC or DC motor. Feedback device 20 measures the motor shaft angle and sends shaft angle to drive amplifier 30 via shaft angle signal 40 in 120-degree Hall effect format. Drive amplifier 30 uses shaft angle to control servomotor 10 via drive signals 60. Control input 50 selects motor speed and direction.

Figure 3A:
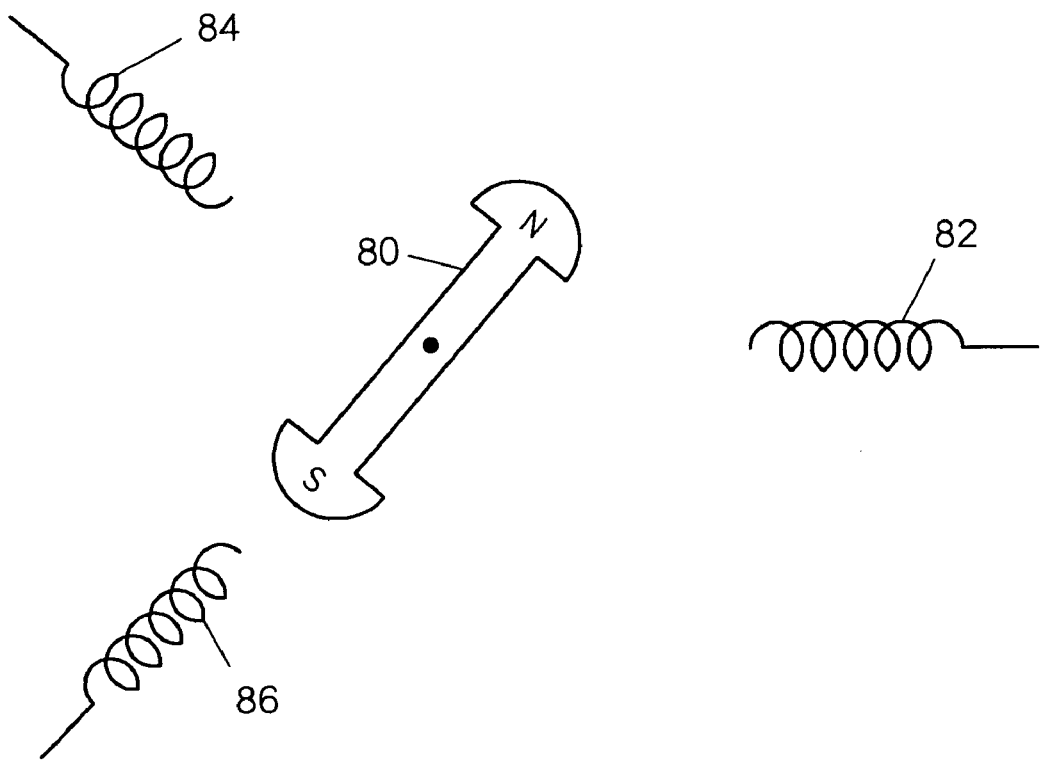
FIG. 3A shows the stator magnet windings and the permanent magnet rotor of a servomotor
Figure 3B:
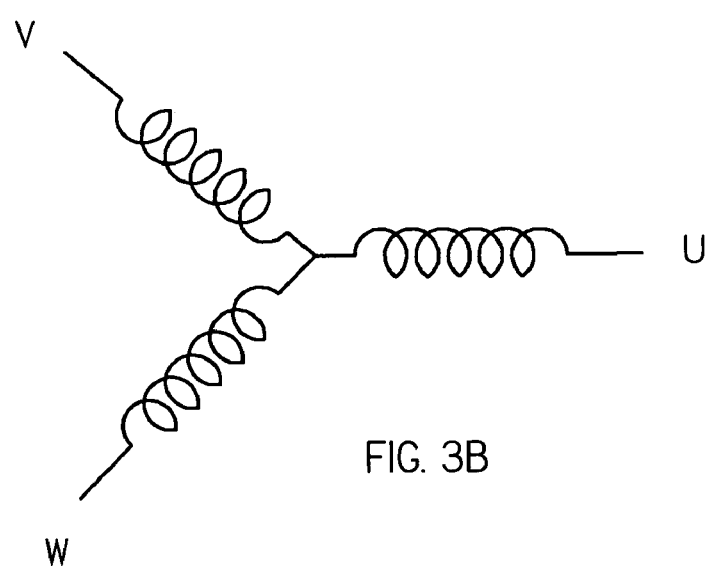
FIG. 3B shows the "Y" connected drive coils of the motor

In a typical motor drive, signals 60 consist of three signals driving three stator windings connected in a "Y" configuration as shown in FIG. 3B. FIG. 3A shows the relationship of the permanent magnet rotor rotation angle with the stator drive magnets. Pairs of magnet coils are successively driven in sequence to move the rotor according to control inputs 50. Feedback device 20 contains 3 Hall effect sensors that produce three signals U, V and W each one shifted in phase from the previous signal by 120 degrees of motor shaft angle. FIG. 4 shows the Hall sensor signals on the left hand side of the table relative to motor shaft angle. The three signals provide a 60 degree resolution shaft angle sensor sufficient to provide commutation. The right side of the table in FIG. 4 shows the motor armature drive signals corresponding to the different rotor angles. A plus sign indicates current flowing into a coil and a minus sign indicates current flowing out of a coil. For example, on line one at zero degrees rotation angle current would be flowing into terminal U and out terminal W.

Figure 2:
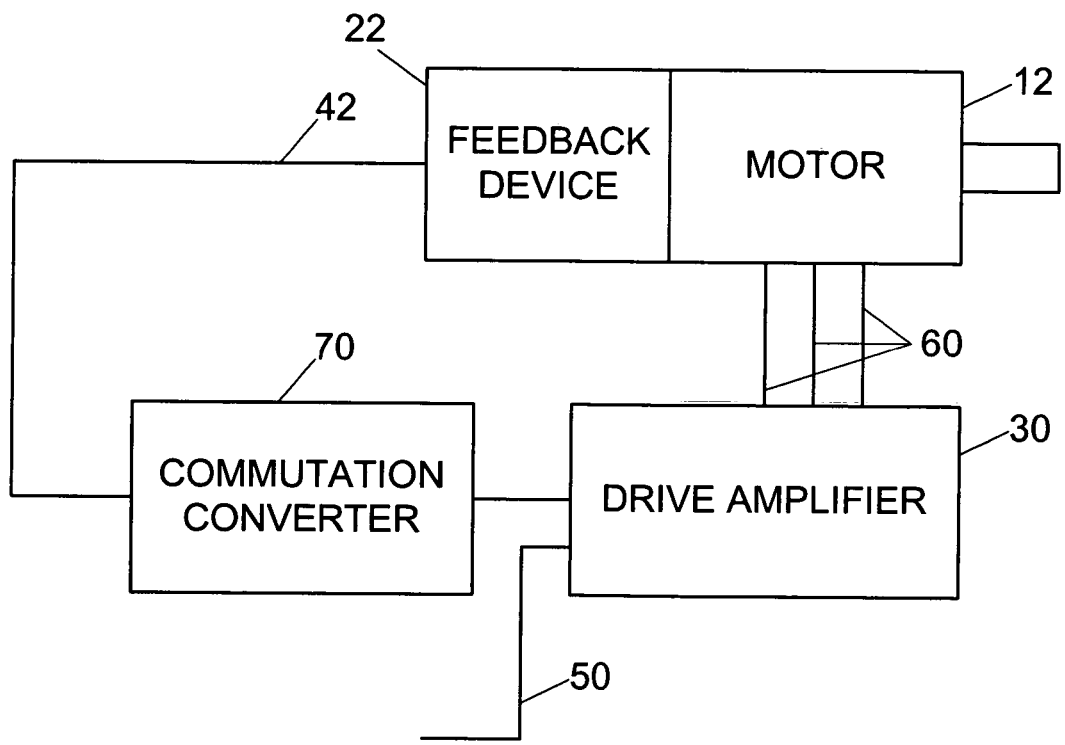
FIG. 2 is a schematic diagram of a servomotor and drive amplifier with a commutation converter between the motor mounted feedback device and the drive amplifier

FIG. 2 shows the servo motor system with a commutation converter. Feedback device 22 measures the shaft angle and produces feedback signal 42 in a different format than the Hall format. Commutation converter 70 translates the feedback device signal to 120 degree Hall format. Drive amplifier 30 accepts the Hall input format and produces the correct armature drive currents 60 to control servo motor 12.

Figure 5:
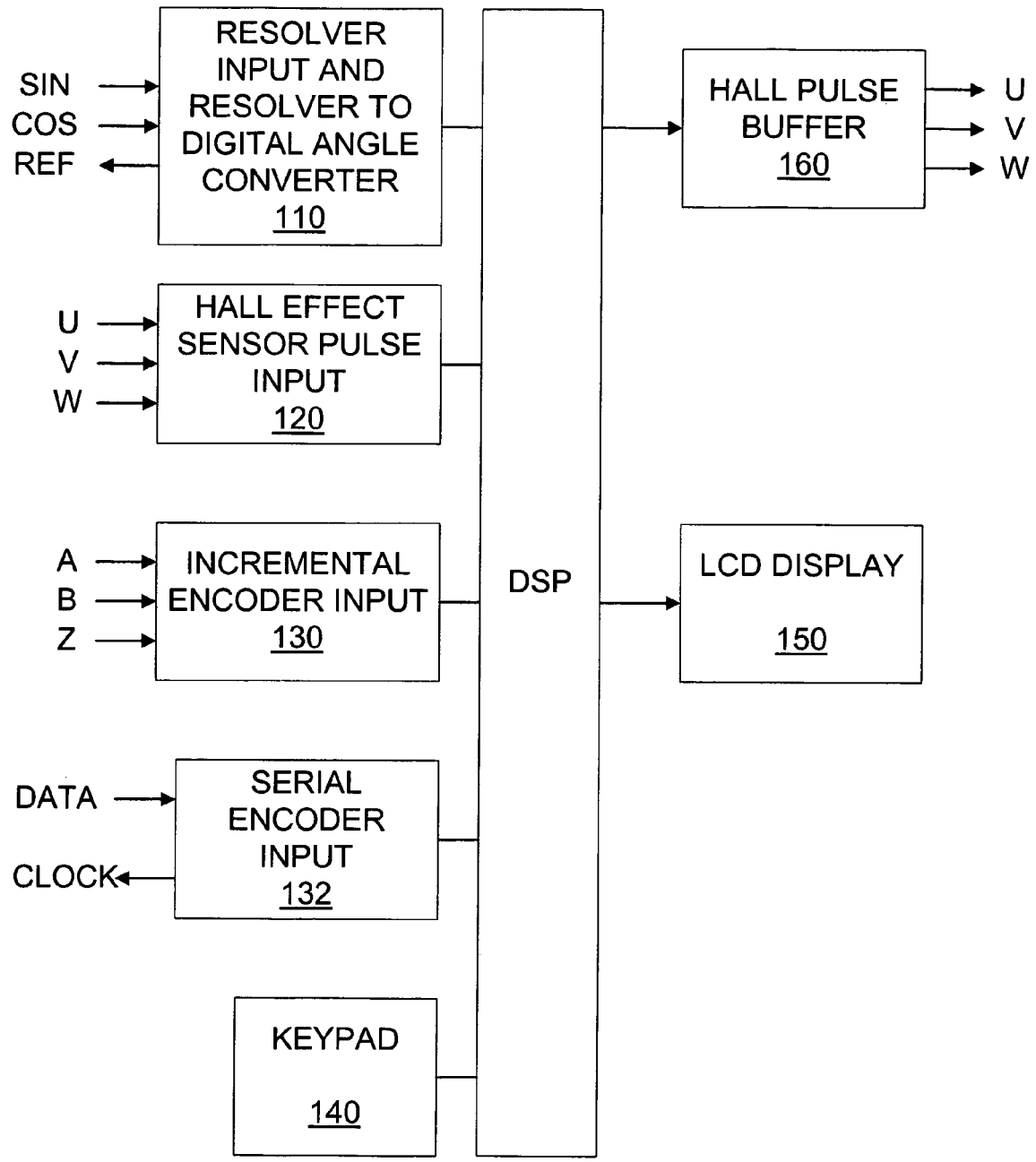
FIG. 5 shows a block diagram of the commutation converter

FIG. 5 is a block diagram of the commutation converter. Input circuitry 110, 120, 130, and 132 receives the feedback device signal from the motor mounted feedback device and conditions it for processing by the Digital Signal Processor (DSP) 100. Only one feedback device interface is normally active at a time. As shown in the figure, the resolver inputs are converted to digital shaft angle in hardware in block 110.

DSP 100 further processes the feedback signals. Based on the signal format associated with the selected feedback device type, DSP 100 converts the active signal to a 10-bit binary angle measure (BAM). The characteristic of the BAM are that zero represents zero degrees and each count between zero and 1023 represents approximately 0.352 degrees (360/1024). The BAM is used as an index into a commutation table to translate the BAM to a commutation angle. Each of the 1024 entries in the commutation table holds the values of U, V and W, the 120 degree Hall pulse format for the corresponding angle. DSP 100 reads the U, V and W entries from the commutation table and sends them to the driver amplifier.

The commutation converter has three modes of operation RUN, STOP and DEBUG. In RUN mode, an enable signal is sent to the driver amplifier to enable the motor drive. The DSP repeatedly converts the commutation feedback signals until either the STOP or DEBUG mode is selected. While in RUN mode, the DSP performs the commutation conversion loop every 100 microseconds, during which time, the feedback device input signal is read, the motor shaft angle is calculated and the 120 degree Hall output to the drive amplifier is updated. Some feedback devices, such as serial encoders, do not update fast enough to maintain the 100-microsecond loop time. Loop time must be extended for such devices to about 150 microseconds.

Motor speed is displayed in RUN mode. Commutation cycles occurring in one second are counted and the result is multiplied by 60 to convert to RPM.

STOP mode disables the driver amplifier and accepts selection of a feedback device type. The feedback device selected causes the DSP to select the associated input circuit. Some feedback device types have further parameter selections. The set of shaft angle inputs and the interpretation of those inputs changes based on the feedback device and associated parameters selected.

DEBUG mode displays the U, V and W Hall output pulse state for the current motor shaft angle. Manually turning the motor shaft changes the angle reported by the feedback device and allows cycling through the six states of the output U, V and W signals. Wiring problems or feedback device selection errors are readily identified in DEBUG mode. When a resolver is selected as the feedback device, shaft angle is displayed to help in debugging.

Some feedback devices report an angle offset from the motor shaft angle, such that the feedback device angle goes through zero at a different rotation angle than the motor shaft. The DSP knows the offset angle from the feedback device selections. The DSP subtracts the offset angle from the BAM before indexing into the commutation table.

Different feedback devices measure shaft angle in different ways and produce different output signals. Any of these angle representations may be converted to any other because each represents shaft angle and once shaft angle is known, any of the other representations may be produced.

Figure 6:
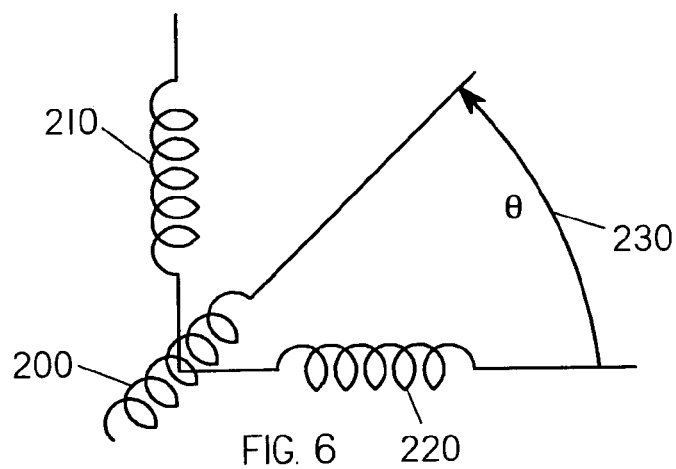
FIG. 6 shows the orientation of coils in the resolver type feedback device

FIG. 6 shows a conceptual diagram of a resolver type of feedback device. Rotor shaft mounted coil 200 is driven with a reference signal of constant frequency and amplitude. Two pickup coils 210 and 220 oriented at right angles to each other sense the reference signal. The amplitude of the signal from pickup coil 210 is proportional to the sine of the shaft angle 230 and the amplitude of the signal from pickup coil 220 is proportional to the cosine of the shaft angle 230. By converting the amplitude of the signal in each pickup coil to digital amplitude and taking the arctangent of Sin/Cos, the digital shaft angle is obtained. The preferred embodiment uses a resolver-to-digital chip set to convert incoming resolver signals to a digital angle.

The resolver may have more than two poles, which mean that the resolver angle output has multiple cycles for each rotation of the motor shaft. In addition, the resolver may have an angular offset from the motor angle. Both of these parameters must be correctly entered into the commutation converter when the resolver type of feedback device is selected.

Figure 7A:
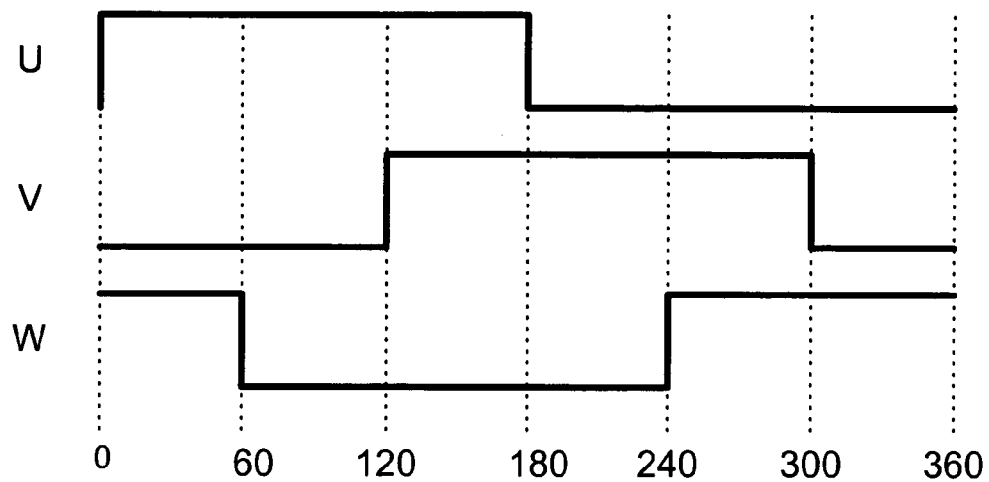
FIG. 7 shows the Hall sensor feedback device signal format
Figure 7B:
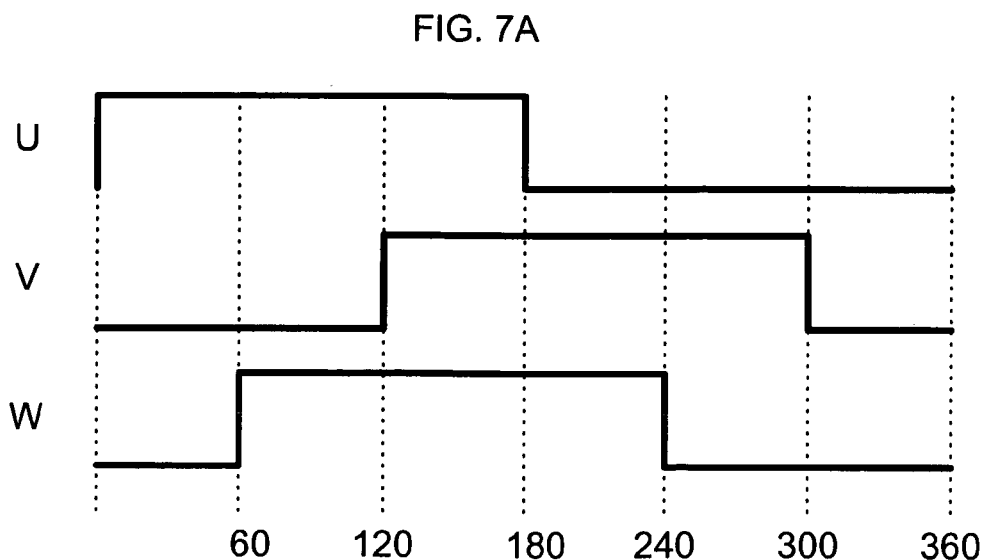

Two Hall detector configurations are in common use as feedback devices. FIG. 7A shows the 120-degree Hall pulse format and FIG. 7B shows the 60-degree Hall pulse format. As can be seen in the figures, the difference is that signal W is inverted. In the preferred embodiment, the output format is 120-degree Hall pulses, so this format will pass through to the output directly. When processing the 60 degree Hall pulse format, the W signal is inverted by DSP 100 before passing the signals through to the output.

Figure 8:
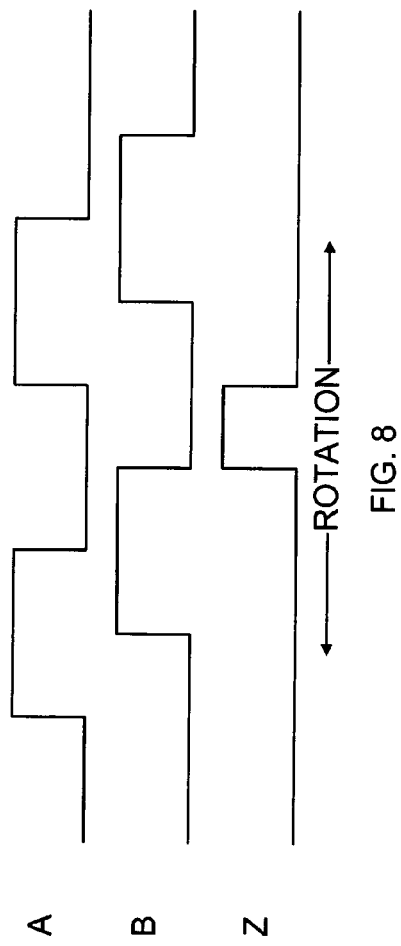
FIG. 8 shows the incremental encoder signal format

The waveforms produced by an incremental encoder type of feedback device are shown in FIG. 8. Quadrature signals A and B indicate an angular step and the direction of the step. The size of the angular step is a parameter of the feedback device design and must be known by the commutation converter to accurately determine the shaft angle. The range of step sizes is tens to thousands of steps per shaft revolution. The angular steps reported by the A and B signals are relative angular motion. Rotation direction is determined by which signal, A or B, leads as shown in FIG. 8. An index pulse Z indicates when the feedback device angle is zero degrees. The absolute angle from an incremental encoder isn't known until the index pulse is received. As motor commutation is dependent on shaft angle information, some other scheme must be implemented to start the motor to get the shaft to rotate to the index. One such scheme comprises providing a Hall format output signal in addition to the incremental encoder signals to give the drive amplifier shaft angle information at power up from which to start driving the motor coils. When provided, the preferred embodiment of the commutation converter passes the Hall format pulses through to the drive amplifier until the index pulse is received at which time the encoder signals are used to determine shaft angle.

Figure 9:
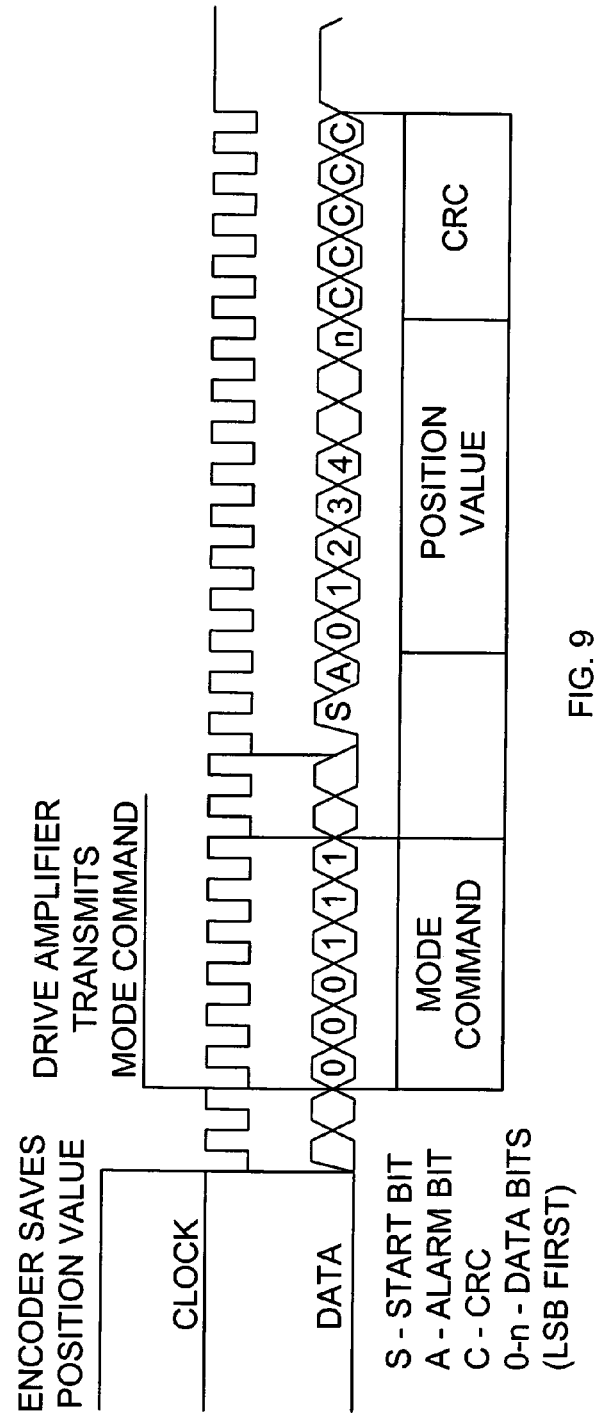
FIG. 9 shows the Endat serial encoder signal format

A number of feedback devices fall into the category of serial encoders. Serial encoders measure shaft angle and transmit the angle in a serial bit stream. The serial bit stream is generally different for each manufacturer and may be different among encoders built by the same manufacturer. The serial bit stream may be proprietary as the manufacturer only intends to communicate between a particular motor's feedback device and its companion drive amplifier. The serial encoders have in common the communication of motor shaft angle to the drive amplifier. FIG. 9 shows the Heidenhain Endat serial encoder format.

The Clock signal is an input to the serial encoder. A bi-directional data line communicates commands to the encoder and data from the encoder. Between angle updates the clock signal is high. When the clock goes low, signaling the start of an angle transfer, the encoder saves the shaft angle value. After two more clock cycles a six-bit command is sent to the encoder. The bits are sent in six sequential clocks cycles and read by the encoder on the rising clock edges. The command 000111, shown in the figure, is Encoder Transmits Position Value. After at least two additional clock cycles, the encoder sends the saved shaft angle value. The angle is sent least significant bit first, preceded by a start bit and an alarm bit and followed by 5 Cyclic Redundancy Check (CRC) bits. The bits are generated by the encoder and are transferred on the negative going clock edge. The start bit is always high and signifies the start of data. The alarm bit set high indicates an error in the encoder. The number of bits contained in the angle is dependent on the encoder and must be entered as a parameter when the Endat serial encoder is selected as the feedback device type. The CRC is a number calculated from the message bits on both the transmitting and receiving ends. The receiver compares the calculated value to the received value to detect bit transmission errors. The CRC is calculated conventionally. Position and angle are used interchangeably for purposes of commutation and both refer to rotor shaft angle.

DSP 100 has on-board programmable serial interface hardware that accepts the serial bit stream. The hardware levels that represent Ones (high) and zeroes (low) depend on the encoder and require conditioning to match the DSP logic levels. Maximum clock frequency is dependent on the particular encoder and must be input as a parameter when the Endat serial encoder is selected as the feedback device.

Some serial encoders also output incremental encoder signals, because of the time it takes to output an angle with the serial encoder. Reading the absolute angle at power up and using the incremental encoder thereafter to keep track of shaft angle can accommodate faster motor speeds.

Other types of feedback devices are in use and more will come into use. Other feedback device formats fall under the broad principals embodied in the current invention. There are also many motor configurations to which the present invention applies. Motors may have more than two poles and the rotor may not be a permanent magnet. The present invention is applicable to these and other motor variants.

What is claimed is:

1. An apparatus for converting motor shaft angle feedback signals to a common shaft angle output format, said apparatus comprising:
    a) shaft angle inputs responsive to resolver, incremental, and serial shaft angle encoder formats;
    b) a shaft angle output; and
    c) a signal processing device coupled to said inputs and coupled to said output, for selection one of said inputs, decoding the shaft angle from said one input, formatting said decoded shaft angle in a shaft angle format for output, and outputting said formatted angle.

2. The apparatus of claim 1 wherein said output format is a 120-degree Hall effect encoder format.

3. An apparatus for testing brushless servo motors, said apparatus comprising:
    a) shall angle inputs responsive to resolver, incremental, serial, and Hall effect encoder signals;
    b) a 120-degree Hall effect shaft angle output;
    c) an operator interface for interactively choosing a shaft angle input;
    d) a signal processing device for selecting said chosen shaft angle input, decoding the shaft angle from said selected input, formatting said decoded shaft angle in a shaft angle format for output, and outputting said formatted shaft;
    e) said operator interface operative to interactively choose parameters for decoding signals from the serial encoder input, the resolver encoder input, and the incremental encoder input; and
    f) said operator interface operative to display motor operating parameters.

4. An apparatus for converting motor shaft angle feedback signals to a common shaft angle output format, said apparatus comprising:
    a) a first shaft angle input responsive to a first shaft angle encoder format;
    b) a second shaft angle input responsive to a second shaft angle encoder format;
    c) a shaft angle output; and
    d) a signal processing device coupled to said inputs and coupled to said output, for selecting one of said inputs, decoding the shaft angle from said one input, formatting said decoded shaft angle in a shaft angle format for output, and outputting said formatted angle.

5. The apparatus of claim 4 wherein said first shaft angle encoder format is the resolver encoder format and said second shaft angle encoder format is the incremental encoder format.

6. The apparatus of claim 4 wherein said first shaft angle encoder format is the resolver encoder format and said second shaft angle encoder format is a serial encoder format.

7. The apparatus of claim 4 wherein said first shaft angle encoder format is the incremental encoder format and said second shaft angle encoder format is a serial encoder format.

* * * * *